United States Patent [19]

Chung et al.

[11] Patent Number: 5,130,944

[45] Date of Patent: Jul. 14, 1992

[54] DIVIDER CIRCUIT ADOPTING A NEURAL NETWORK ARCHITECTURE TO INCREASE DIVISION PROCESSING SPEED AND REDUCE HARDWARE COMPONENTS

[75] Inventors: Ho-sun Chung; Sin-jin Kim; Tae-hun Kim, all of Taegu, Rep. of Korea

[73] Assignee: Samsung Electronics Co., Ltd., Kyunggi, Rep. of Korea

[21] Appl. No.: 549,942

[22] Filed: Jul. 9, 1990

[30] Foreign Application Priority Data

Apr. 3, 1990 [KR] Rep. of Korea ............... 90-4515[U]

[51] Int. Cl.$^5$ .............................................. G06F 7/52
[52] U.S. Cl. ................................................. 364/766
[58] Field of Search ................................. 364/766, 767

[56] References Cited

U.S. PATENT DOCUMENTS

| | | | |
|---|---|---|---|
| 3,257,548 | 6/1966 | Fleisher et al. | 364/766 |
| 3,803,393 | 4/1974 | Wang | 364/766 |
| 3,816,733 | 6/1974 | Sather | 364/766 |
| 3,956,621 | 5/1976 | Booth | 364/766 |
| 4,381,550 | 4/1983 | Baker | 364/766 |
| 4,713,790 | 12/1987 | Kloker et al. | 364/784 |
| 4,722,069 | 1/1988 | Ikeda | 364/767 |
| 4,891,780 | 1/1990 | Miyoshi | 364/766 |
| 5,016,211 | 5/1991 | Jeong | 364/786 |

*Primary Examiner*—David H. Malzahn
*Attorney, Agent, or Firm*—Cushman, Darby & Cushman

[57] ABSTRACT

A divider circuit for efficiently and quickly performing a hardware implemented division by adopting a neural network architecture. The circuit includes a series of cascaded subtracter components that complement the divisor input and effectively perform an adder function. The subtracters include a synaptic configuration consisting of PMOS transistors, NMOS transistors, and CMOS inverters. The components are arranged in accordance with the predetermined connection strength assigned to each of the transistors and its respective position in the neural type network arrangement.

9 Claims, 4 Drawing Sheets 5,130,944

DIVIDER CIRCUIT ADOPTING A NEURAL NETWORK ARCHITECTURE TO INCREASE DIVISION PROCESSING SPEED AND REDUCE HARDWARE COMPONENTS

BACKGROUND OF THE INVENTION

1. The Field of the Art

The present invention relates to a divider and, more particularly, a divider of which the processing speed is very fast and based on the concept of a neural network model.

2. Description of the Prior Art

In general, the addition, substraction, multiplication and division arithmetical operations are a basic principle of all arithmetical operations. Among the four arithmetical operations, division is the most complicated operation and can be accomplished by using a programmed method implemented by software or a method implemented by hardware and composed of registers, subtracters, control logic and etc. A run time for a method using combinational logic is equal only to the time required to pass a signal through a gate array. Hence, in such method the processing speed is fastest. This method, however, has a defect. The processing speed is very fast but the area occupied on a chip is greatly increased by the use of many combinational logic components.

Meanwhile, the processing speed of a method using registers, subtracters and control logic is slower than the method using combinational logic but results in a chip area that is considerably smaller.

SUMMARY OF THE INVENTION

It is accordingly an object of the present invention to solve the problems of the prior art as discussed above and to provide an improved divider which can considerably reduce chip area and achieve a high processing speed by implementing the concept of the neural network model.

In order to achieve the aforementioned object, the present invention provides a binary divider for obtaining a quotient and a remainder in a division operation dividing a dividend by a divisor. The divider includes a plurality of combination circuits of a substracter and a selecting means corresponding to each digit of the dividend, the subtracter then receiving a dividend value of a corresponding digit as a least significant bit of a minuend, receiving a value transferred from the front stage as other bits of the minuend, and subtracting the divisor therefrom.

The divider further comprises selecting means connecting each combination circuit in a cascade toward a low order position from a high order position to be transferred to the next stage by selecting the minuend when the subtracted result of said subtracter is negative or by selecting the result when the same subtracted result is positive, wherein borrow outputs of the subtracters are outputted as a quotient of the division result and a minuend of the final stage subtracter is outputted as a remainder.

The subtracters are composed of a plurality of 3-bit adders having PMOS transistors and NMOS transistors, respectively, and are based on a neural network model.

DETAILED DESCRIPTION OF THE PREFERRED EMBODIMENTS

Embodiments of the present invention will be described in more detail by reference to the accompanying drawings.

Firstly, the basic principle of division will be observed before an explanation of a preferred embodiment of the present invention.

Figure 1:
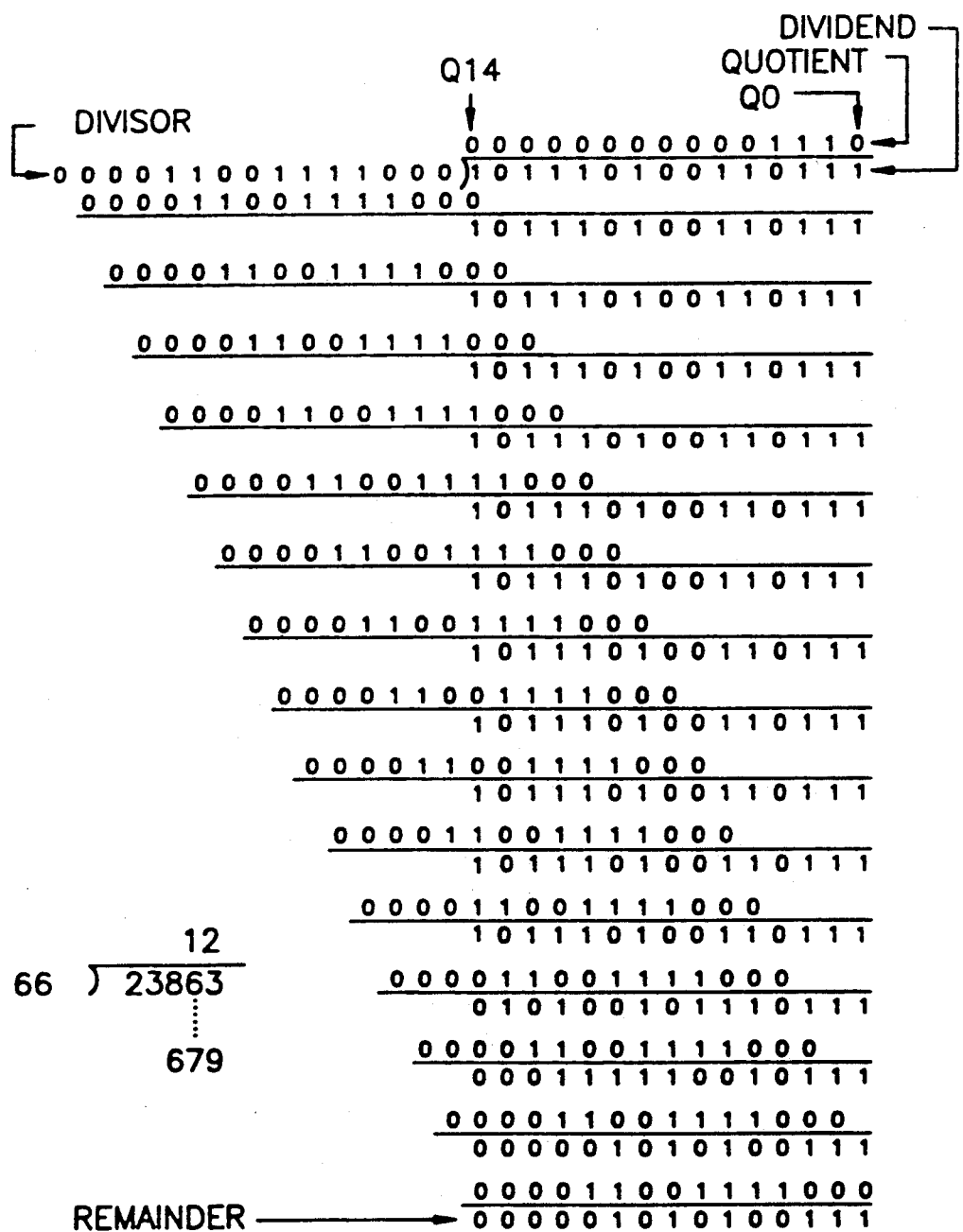
FIG. 1 is a numerical processing diagram for explaining a division algorithm adopted in the present invention.

Referring to FIG. 1, the principle of division is such that when a divisor is sequentially subtracted from a dividend regardless of a concrete expression of numbers, such as when the dividend is not subtracted from the divisor because the one is smaller than the other, the MSB of a quotient becomes "0". Alternately, when the divisor is subtracted from the dividend, the MSB of the quotient becomes "1". Also, when the result is a positive number, the result value of the subtraction is taken as a minuend of the next subtraction. When the result is a negative number, the value prior to a subtraction operation is taken as a minuend of the next subtraction. As values are obtained in this manner, the value obtained by shifting the divisor to the one-bit-right side (one-bit-lower bit position side) of the previous operation is taken as a subtrahend and the subtraction is performed again. And the MSB of the quotient, that is, Q14 is obtained from the borrow value of this process.

According to the result of this subtraction, a value of a minuend is obtained again from the value before subtracting or from the result value of the subtracting, and a next operation is then performed.

This process is performed repeatedly until Q0 is obtained, and it is thus possible to obtain a 15-bit quotient. The dividend value, after Q0 is obtained, becomes a remainder.

Meanwhile, for a more accurate calculation, that is, in order to obtain the result below decimal point, the aforementioned processes can be repeated many times so that a quotient having more significant bits is obtainable.

This embodiment includes, according to the aforementioned algorithm, a 16-bit divider having 15-bit subtracters SUB0 to SUB 14 and selecting means MUX0 to MUX14.

Figure 2:
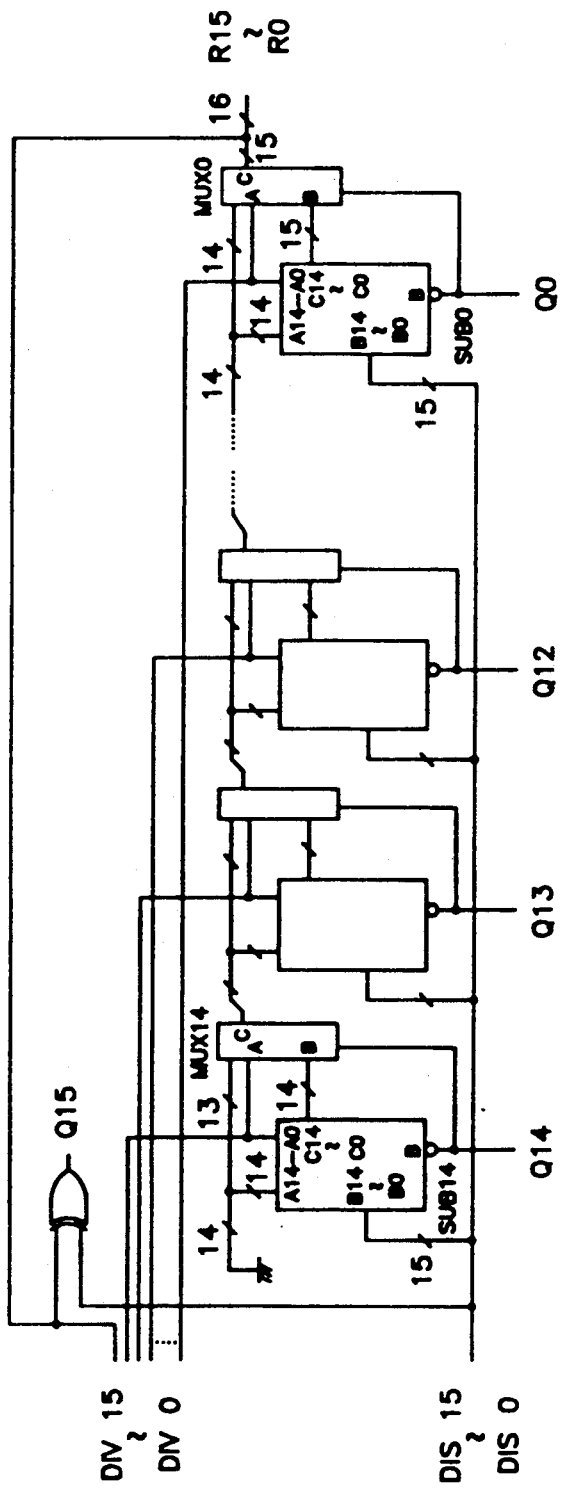
FIG. 2 is a configuration diagram of a 16-bit divider according to the present invention.

Referring to FIG. 2, each 16-bit divider is composed of fifteen 15-bit subtracters SUB0 to SUB14 and fifteen selecting means MUX0 to MUX14 corresponding to a position number of a dividend. The MSB DIV14 of the dividend is inputted to A0 of minuend input terminals A14 to A0 in subtracter SUB14. The remaining minuend input terminals A14 to A1 are grounded for "0" to be input.

On the other hand, the 15-bit divisors DIS14 to DIS0 are inputted to the subtrahend input terminals B14 to B0. The selecting means MUX14 receives A13 to A0 of the dividend before subtraction or C13 to C0 of the subtracted result according to the subtracted result value performed in SUB14, and transfers C13 to C0 or A13 to A0 to the subtracter SUB13. Also, a borrow output of the subtracter SUB14 is supplied to the select terminal of selecting means MUX14. In this case, if the result of the subtracter SUB14 is a negative number, the borrow output results in a value "1", whereas if the result is a positive number, the borrow output results in a value "0".

Accordingly, the selecting means MUX14 by using the value "1" or "0", selects C13 to C0 from the value of the result when the result of the subtracter is a positive number, and transfers it to the next stage. When the result is a negative number the multiplexer means MUX14 selects A13 to A0 of the minuend prior to the subtraction and transfers it to the next stage.

Further, the next subtracter SUB13 receives 14 bits as the minuend from the front-stage selecting means MUX14, then a 15th bit is taken from corresponding bit DIV13 in the dividend to form a new LSB, and upon receiving divisors DIS14 to DIS0, the subtracter SUB13 performs a calculation.

The operation of the aforementioned algorithm is repeatedly performed in a cascaded connection to subtracter (SUB0). Accordingly, the quotient Q14 to Q0 is obtained from each borrow output of the subtracters. The result value C14 to C0 of the final stage subtracter SUB0 corresponds to the remainder RM14 to RM0. At this time, each sign bit DIS15, DIV15 of the dividend and the divisor, respectively, are combined by an exclusive OR gate XOR and provided to form the sign bit of the quotient.

Figure 3:
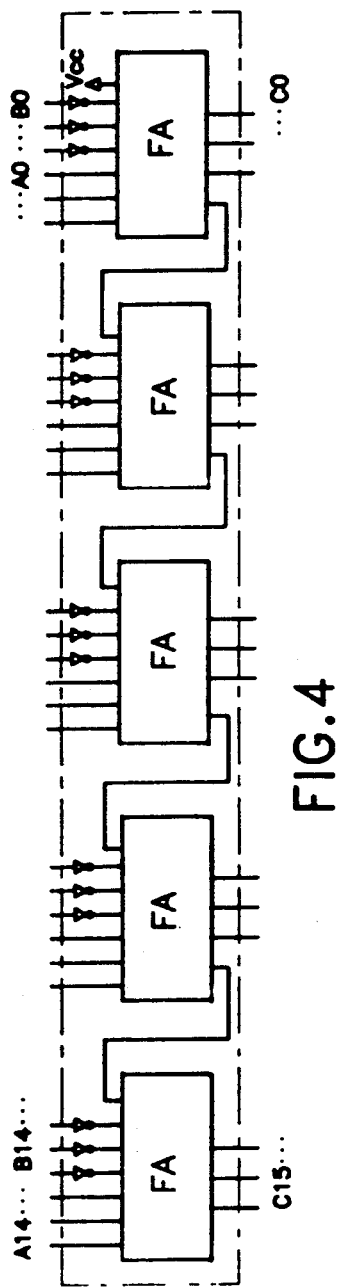
FIG. 3 is a configuration diagram of a 15-bit subtracter shown in FIG. 2.

Referring to FIG. 3, each of the aforementioned 15-bit subtracters consist of fifteen inverters for inverting the inputting minuend B0-B14 and five 3-bit full adders FA. These five 3-bit full adders FA are connected in cascaded fashion to transfer a carry to the upper position side. The first power supply voltage Vcc is supplied to the least significant position carry input receiving a value "1". The highest significant position carry output is provided as the borrow output B of the subtracters.

Also, the 3-bit full adders receive the 15-bit minuends A14 to A0 and 15-bit subtrahends B14 to B0. Each adder inputs 3 minuend bits and 3 subtrahend bits and outputs a result via a 3-bit output and a carry.

Figure 4:
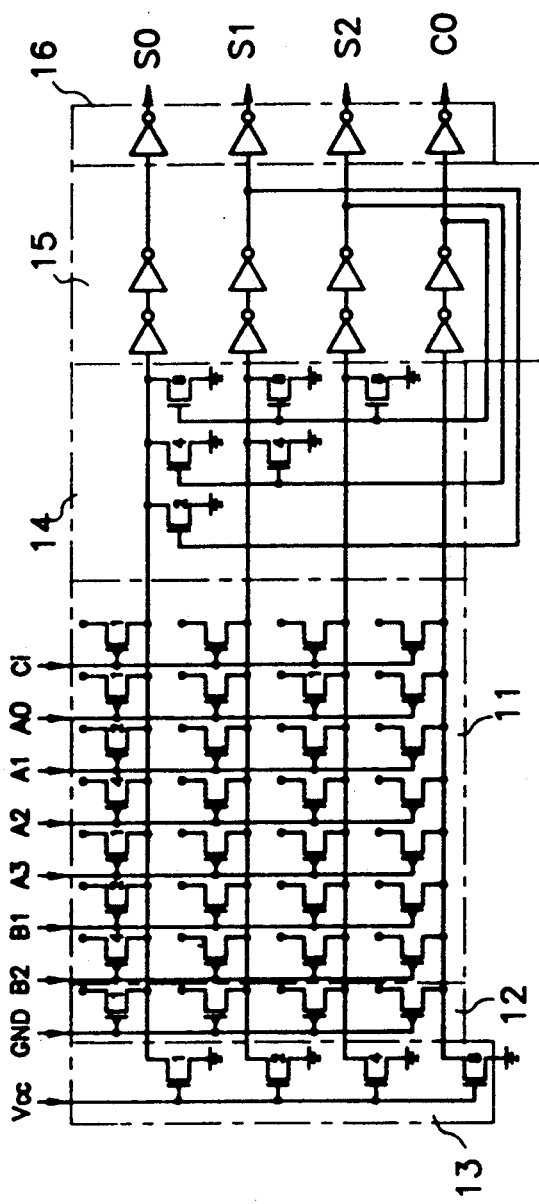
FIG. 4 is a circuit diagram of a 3-bit adder shown in FIG. 3.

Referring to FIG. 4, each of the 3-bit full adders FA according to the present invention consist of PMOS transistors and NMOS transistor and are implemented based on the concept of the neural network model.

More specifically, the 3-bit full adders FA are shown having four output lines S0-S2, C0, an input synapse group 11, a first bias synapse group 12, a second bias synapse group 13, a feed back synapse group 14, a neuron group 15 and an inverter group 16.

The input synapse group 11 consists of a 3-bit augend, a 3-bit addend and input synapses for combining with the respective output lines S0-S2, C0, and with the first power supply voltage Vcc, and having a connection strength determined by a 1-bit carry input transmitted from a low order position.

The first bias synapse group 12 consists of the synapses for biasing the respective output lines S0-S2 C0 with the first power supply voltage Vcc and having a unit connection strength.

The second bias synapse group 13 consists of synapses for biasing the respective output lines S0-S2, C0 with the second power supply voltage GND and having a connection strength equal to each bit weight in the respective output bits.

The feed back synapse group 14 consists of synapses for combining the output lines of each low order output bits with the second power supply voltage GND and having a connection strength equal to a 2-bit weight in accordance with the value of a high order output bit.

The neuron group 15 consists of CMOS buffers connected to each output line for outputting the excitation status of the corresponding output lines through its respective synapse when the sum of the connection strength of the first power supply voltage Vcc is larger than that of the second power supply voltage GND and for outputting a base status when the sum of the connection strength of the first power supply voltage Vcc is equal to or smaller than that of GND. Inverter group 16 consists of CMOS inverters for inverting the output bit of the respective neuron.

The input and first bias synapses are made up of PMOS transistors. The second bias and the feed back synapses are made up of NMOS transistors. The connection strength of each synapse is determined by the geometric aspect ratio (channel width W/channel length L) of the corresponding MOS transistor. A unit connection strength is "1" when the W/L geometric aspect ratio of a PMOS transistor is 5 $\mu$m/2 $\mu$m. The unit connection strength is "1" when the W/L geometric aspect ratio of an NMOS transistor is 2 $\mu$m/2 $\mu$m.

Figure 5:
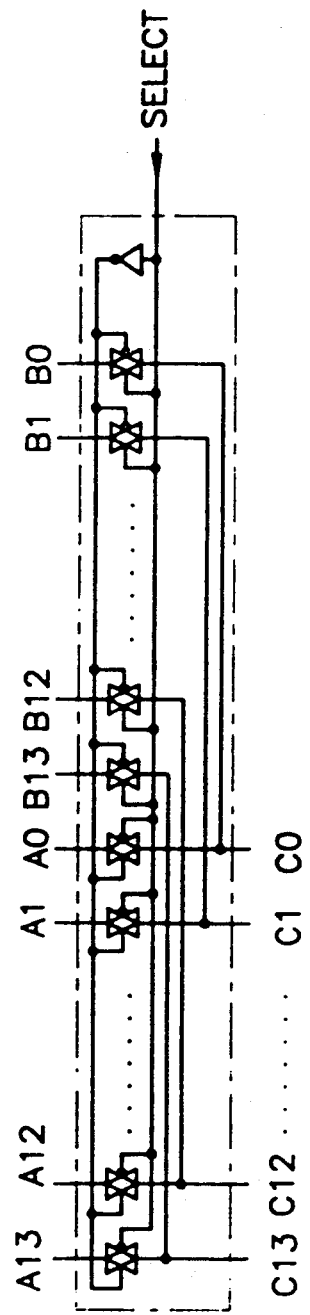
FIG. 5 is a configuration diagram of a selecting means shown in FIG. 2.

Referring to FIG. 5, the selecting means according to the present invention is a line multiplexer having transmission gates and inverters. In this embodiment, the line multiplexer includes twenty-eight transmission gates for selecting A13 to A0 corresponding to the subtrahends of the subtracters, and selecting C13 to C0 corresponding to the result values of the subtraction in accordance with the borrow outputs of the subtracters, and transmitting the A13 to A0 or C13 to C0 selected bits to the next stage. The transmission gates are connected to receive the selecting signal, that is, the borrow output and the inverted value of the borrow output, respectively.

As previously mentioned, the divider according to the present invention comprises an adder having a simple circuit construction based on the concept of a neural network model. Therefore, chip area is considerably reduced and the processing speed is very fast as compared with conventional combination circuits.

What is claimed is:

1. A circuit for obtaining a M-bit quotient signal and an M-bit remainder signal by dividing an M-bit dividend signal by an M-bit divisor signal, the circuit comprising:

M substracting means arranged in a cascaded fashion, each subtracting means outputting one bit of said M-bit quotient signal, a first subtracting means outputs the most significant bit of said M-bit quotient signal and each subsequent cascaded subtracting means outputs a next lower order it of said M-bit quotient signal, each subtracting means comprising:

a first input for receiving an M-bit input signal associated with a corresponding bit of said M-bit dividend signal;

a second input means for receiving said M-bit divisor signal; and control means for outputting a first value of an M-bit next stage signal if said M-bit input signal is less than said M-bit divisor signal and outputting a second value of an M-bit next stage signal if said M-bit input signal is not less than said M-bit divisor signal, said control means outputting a first bit value of a corresponding quotient bit signal when said control means outputs said first value M-bit next stage signal and outputting a second bit value when said control means outputs said second value M-bit next stage signal;

M multiplexing means, each multiplexing means being disposed between adjacent ones of said M subtracting means and inputting from a corresponding previous stage subtracting means, an M-bit next stage signal, an M-bit input signal associated with a previous stage corresponding bit of said M-bit dividend signal, and a previous stage quotient bit signal, each multiplexing means outputting said M-bit next signal in response to the quotient bit signal having said second bit value and outputting said M-bit input signal associated with said previous stage dividend signal in response to the quotient bit signal having said first bit value, each M-bit input signal in the cascade having the corresponding bit of said M-bit dividend signal further comprises the output signal from the respective previous stage multiplexing means, the output signal of the respective last stage multiplexing means corresponding to said M-bit remainder signal.

2. The circuit of claim 1 wherein each of said M multiplexing means comprises means for inverting the received previous stage quotient bit signal and a plurality of CMOS transmission gates for multiplexing one of the received M-bit next stage signal and the received M-bit input signal in response to said received previous stage quotient bit signal and the inverted previous stage quotient bit signal.

3. The circuit of claim 1 wherein each control means includes a plurality of inverters, for complementing the M-bit divisor signal, and a plurality of 3-bit full adders, connected in cascade order from a low order to a higher order bit progression, for adding the complemented M-bit divisor signal and the respective M-bit signal and outputting a next stage signal and a quotient bit signal in response thereto.

4. The circuit of claim 3 wherein each 3-bit adder includes four output lines corresponding to a 3-bit value and an addition carry value, respectively, each output line comprising:

an input group for receiving 3 bits of the complemented M-bit divisor signal, 3 bits of the respective M-bit input signal, and a carry signal received from a lower order full adder stage, the received signals being connected to each of the respective output lines via a PMOS transistor means, a PMOS transistor in said PMOS transistor means having a predetermined connection strength associated with the corresponding bit order of the received signal;

first bias means for supplying a first power supply voltage to each respective output line;

second bias means having an NMOS transistor means for biasing each respective output line with a second power supply voltage and having a predetermined connection strength associated with the corresponding bit order of the respective output line bit signal;

a feedback group for biasing a respective one of the three output lines corresponding to a non-carry output line bit signal with the second power supply voltage, each respective one of the three output lines having at least one NMOS transistor means, each NMOS transistor means having a predetermined connection strength associated with the corresponding bit orders of the higher bit order output lines connected thereto, the connection strength of the respective carry output line being twice as great as that of the highest order output line; and a neuron group for receiving the sum of the signals from each of the input group, the first bias means, the second bias means, and the feedback group and generating a respective output line bit value in response thereto.

5. The circuit of claim 4 wherein each respective neuron group comprises two serially connected CMOS inverters.

6. The circuit of claim 4 wherein predetermined output line bit values generated by said respective neuron groups are fed back into a respective feedback group of a different output line.

7. The circuit of claim 6 wherein the connection strength is defined as a geometric aspect ratio (W/L) of a particular transistor, the ratio being a relation of the particular transistor's channel width (W) to its length (L).

8. The circuit of claim 7 wherein a unity ("1") connection strength of a PMOS transistor is represented by a W/L ratio of 5 $\mu$m/2 $\mu$m.

9. The circuit of claim 8 wherein a unity ("1") connection strength of an NMOS transistor is represented by a W/L ratio of 2 $\mu$m/2 $\mu$m.

* * * * *